United States Patent [19]

Mori et al.

[11] 4,031,066

[45] June 21, 1977

[54] FLEXIBLE POLYBUTADIENE RESIN COMPOSITION HAVING EXCELLENT ELECTRICAL PROPERTIES

[75] Inventors: Atsushi Mori, Ichihara; Hiroo Muramoto, Chiba, both of Japan

[73] Assignee: Nippon Soda Company Limited, Tokyo, Japan

[22] Filed: Mar. 4, 1975

[21] Appl. No.: 555,143

[30] Foreign Application Priority Data

Mar. 7, 1974  Japan .............................. 49-25716

[52] U.S. Cl. .......................................... 260/77.5 CR
[51] Int. Cl.$^2$ .......................................... C08G 18/62
[58] Field of Search .............. 260/859 R, 829, 29.8, 260/77.5 CR

[56] References Cited

UNITED STATES PATENTS

| | | | |
|---|---|---|---|
| 3,437,622 | 4/1969 | Dahl | 260/29.8 |
| 3,562,355 | 2/1971 | Holden | 260/829 |
| 3,678,014 | 7/1972 | Suzuki et al. | 260/859 R |
| 3,714,110 | 1/1973 | Verdol et al. | 260/33.6 AQ |
| 3,862,068 | 1/1975 | Russell | 260/829 |

*Primary Examiner* — M. J. Welsh
*Attorney, Agent, or Firm* — George B. Oujevolk

[57] ABSTRACT

A flexible polybutadiene resin composition having 100 parts of (a), 5 to 120 parts of (b), and 50 to 500 parts of (c), where a. is a thermosetting resin having a molecular weight of 500 to 100,000 and having the formula:

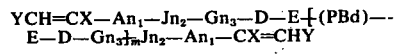

$$YCH=CX-An_1-Jn_2-Gn_3-D-E\!\!+\!\!(PBd)- \\ E-D-Gn_3\!\!+\!\!_m Jn_2-An_1-CX=CHY$$

wherein X is hydrogen, or an alkyl radical containing up to four carbon atoms; Y is selected from the group consisting of hydrogen, phenyl, and alkoxycarbonyl; A is a carboxyl, or a carbonyl group; J is an alkylene group containing less than five carbon atoms and G is selected from the group consisting of urethane, carboimino and ureylene group; E is urethare or carboimino, and can be the same or different from G; D is selected from the group consisting of alkylene, cycloalkylene, phenylene, naphthylene, pyrene, bis(-phenylene)methylene and tris(phenylene)methylidyne radical in which the radical may be substituted by a lower alkyl radical); PBd is a polybutadiene or copolybutadiene or hydrogenized polybutadiene chain having a polymerization degree of from 4 to 370 and from about 50 percent to about 100 percent of 1,2-configuration; $n_1$, $n_2$ and $n_3$ express 0 or 1 respectively, wherein a combination of (1) $n_1$ is 1, $n_2$ is 1, and $n_3$ is 0 and (2) $n_1$ is 1, $n_2$ is 0 and $n_3$ is 0 does not occur; and $m$ expresses an integer of 1 to 3;

b. is a solid plasticizer having 50° to 100° C of softening point, less than 50 of bromine value and 500 to 3,000 of number average molecular weight; and, c. is a vinyl monomer.

2 Claims, No Drawings

FLEXIBLE POLYBUTADIENE RESIN COMPOSITION HAVING EXCELLENT ELECTRICAL PROPERTIES

DETAILED EXPLANATION OF THE INVENTION

This invention relates to a novel curable polybutadiene resin composition and more particularly is concerned with a novel curable resin composition having excellent electrical properties and flexibility.

It is well known that a polybutadiene chain mainly comprising the 1,2-mode of addition i.e., a polymer chain having; the following pendant vinyl structure

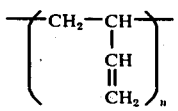

(hereinafter called "1,2-configuration"); contributes to excellent electrical properties. U.S. Pat. No. 3,678,014 discloses that a polybutadiene derivative having olefinic bond groups combined with an ureylene, urethane or carboimino group on each end of the polybutadiene chain is cured at a relatively low temperature within a short period of time and has good flexibility, mechanical strength and crack resistance. However, the inventors found that when the polybutadiene derivative is used for electrical insulating varnish, the cured varnish is not flexible enough for practical use.

On the other hand, in Japanese patent publication No. sho 47-25239 polybutadiene resin is used with petroleum resin having a high content of unsaturated double bonds in order to obtain a electrical insulating varnish with excellent flexibility.

However, the varnish thus obtained has some disadvantages in practice such as short storage life, very short pot-life and making the cured varnish opaque because of high content of unsaturated double bonds.

Accordingly, it is an object of this invention to overcome the aforementioned problems and disadvantages.

It is another object of this invention to provide a new resin composition having flexibility.

It is another object of this invention to provide a new resin composition having excellent storage stability and pot life.

It is another object of this invention to provide a new resin composition which does not remain sticky at all.

It is another object of this invention to provide a new resin composition having excellent electrical properties such as volume resistivity, dielectric dissipation factor, dielectric constant, arc resistance and low shrinkage.

Other objects and advantages of this invention will further become apparent hereinafter.

We have discovered that a polybutadiene derivative consisting of a polybutadiene chain having olefinic bond groups combined with a ureylene, urethane or carboimino group on the end of the polybutadiene chain gets excellent flexibility and storage stability by mixing with solid plasticizer having a very low bromine number.

In the invention, polybutadiene resin composition basically contains 100 parts of polybutadiene derivative having 500–100,000 of molecular weight, consisting of a polybutadiene chain having an olefinic bond groups combined with a ureylene, urethane or carboimino group on the end of the polybutadiene chain, 5–120 parts of solid plasticizer and 50–500 parts of vinyl monomer; wherein the polybutadiene chain comprises more than 30% preferably more than 50% of 1,2-configuration of butadiene or a hydrogenized polybutadiene chain which is hydrogenated up to 95% of unsaturated double bonds in the chain.

The polybutadiene derivative in the invention is shown in U.S. Pat. No. 3,678,014 and can be prepared by the following methods. A : A polybutadiene having the functional groups, which contain an active hydrogen component, in each end of the polybutadiene chain is allowed to react with an isocyanate compound having an olefinic bond group. The quantity of the isocyanate compound is such that the ratio of the isocyanate group to the active hydrogen component of the functional group of the polybutadiene is not less that 0.5 and preferably from 0.8 to 1.2. The reaction is carried out at an elevated temperature between 50° C and 150° C for from 0.5 to 10 hrs in the presence of a promotor and diluent if desired. An isocyanate compound having an olefinic bond group which includes vinyl isocyanate, vinylphenyl isocyanate, vinylphenyldiisocyanate, allyl isocyanate, 2-butene-1,4-diisocyanate, trans-vinylene diisocyanate, and also isocyanate compounds having an olefinic bond group are prepared by the reaction between an olefinic compound having at least one functional group which contains an active hydrogen atom such as hydroxyl, amino or carboxyl group, and polyisocyanate compounds.

Typical examples of the olefinic compounds which may be employed in the above reaction are: olefinic alcohols; e.g., allyl alcohol, methallyl alcohol,cinnamic alcohol,vinyl phenols, $\alpha,\beta$-unsaturated dicarboxylic acids; e.g., monoester of maleic acid or fumaric acid, aromatic carboxylic acids; e.g., p-vinyl bonzoic acid, acid amides; e.g., maleic acid amide anhydride, olefinic amines; e.g. 2-aminoethylvinylether and vinylaniline, acrylamides; e.g., 2-aminoethyl acrylamide and 2-aminopropyl acrylamide, methacrylamides; e.g., 2-aminoethyl methacrylamide, and 2-aminopropyl methacrylamide, olefinic acids; e.g. acrylic acid, methacrylic acid, cinnamic acid and crotonic acid, hydroxyalkyl acrylates; e.g. 2-hydroxyethyl acrylate, 2-hydroxypropyl acrylate, 2-hydroxybutyl acrylate, $\omega$-hydroxybutyl acrylate and p-hydroxyphenyl acrylate, hydroxyalkyl methacrylates; e.g., 2-hydroxyethyl methacrylate, 2-hydroxypropyl methacrylate, 2-hydroxybutyl methacrylate, $\omega$-hydroxybutyl methacrylate and p-hydroxyphenyl methacrylate. Among these olefinic compounds, hydroxyalkyl acrylates, hydroxyalkyl methacrylates, acrylamides and methacryl amides are particularly favorable because the olefinic bond group, which is close to the electrophilic group (carbonyl group) and has a moderate distance from ureylene, urethane or carboimino bond, is extremely activated in the curing process and consequently the obtained polybutadiene derivative can be cured within a short period of time at a relatively low temperature.

Suitable polyisocyanate compounds which may be employed the reaction with the above olefinic compounds include the following aliphatic polyisocyanates; e.g. hexamethylene diisocyanate, pentamethylene diisocyanate, butylene diisocyanate, propylene diisocyanate, ethylenediisocyanate, ethylidene diisocyanate, aromatic polyisocyanates; e.g., 2,4-toluylene diisocyanate, 2,6-toluylene diisocyanate, 1,4-benzene diisocyanate, diphenylmethane-4,4'-diisocyanate, 2,2-diphenylpropane-4,4'-diisocyanate, 3,3'-dimethyldiphenylmethane diisocyanate, 1-chlorobenzene-2,4-diisocyanate, dimethylbenzene diisocyanate, p-or m-phenylene diisocyanate, naphthylene diisocyanate, triphenylmethane triisocyanate, pyrene diisocyanate, nitrodiphenyldiisocyanate, 1-methylbenzene-2,4,6-triisocyanate and xylylene diisocyanate and alicyclic polyisocyanates; e.g., cyclopentylene diisocyanate and cyclohexylene diisocyanate. These polyisocyanate compounds must be employed in an excess quantity to stoichiometrical amount and, in other words, the reaction is carried out so as to maintain the equivalent mole ratio of the polyisocyanate compound to the olefinic compound containing active hydrogen atom as not less than 1.1 and preferably between 1.5 and 2.5.

B: A polybutadiene derivative is also prepared by another process in which the said olefinic compound reacts with the isocyanate prepolymer which is obtained by the reaction between the polyutadiene having terminal functional groups containing active hydrogen atom and an excess quantity for the stoichiometrical amount of the polyisocyanate compound. In this case, the equivalent mole ratio of a isocyanate group of the prepolymer to an active hydrogen atom of the olefinic compound is settled not less than 0.5 and preferably 0.8–1.2.

Typical examples of polybutadiene having the functional groups, which contain an active hydrogen component on each end of polybutadiene chain are as follows; polybutadiene glycol and hydrogenized polybutadiene glycol having hydroxyl (—OH) group on each end of polybutadiene chain; polybutadiene dicarboxylic acid and hydrogenized polybutadiene dicarboxylic acid having carboxyl (—COOH) group on each end of polybutadiene chain; diamino polybutadiene, diamino hydrogenized polybutadiene having amino (—NH$_2$) group on each end of polybutadiene chain; polybutadiene di-oxicarbonyl alkylcarboxylic acid, hydrogenized polybutadiene di-oxicarbonyl alkylcarboxylic acid having oxicarbonyl alkyl carbonyl (—OOCRCOOH) group, wherein R represents alkyl group e.g., methyl, ethyl, propyl, butyl group, alkenyl group e.g., ethylene, propylene group, phenyl group. These polybutadiene having the functional groups is produced by conventional process as shown in U.S. Pat. No. 3,678,014 namely in the presence of an aromatic hydrocarbon activator such as naphthalene or 1,2-diphenylbenzene if necessary, butadiene or a mixture of butadiene and diluent is introduced into a Lewis base solvent such as tetrahydrofuran or ethylene glycol which contains a dispersed alkali metal such as sodium and lithium under chilling below −30° C and agitation. By mixing the resulting reaction mixture with an electrophilic agent such as carbon dioxide, alkylene oxide or alkylene imine, the corresponding polybutadiene dicarboxylic acid, polybutadiene glycol and diaminopolybutadiene can be obtained. Further, these hydrogenized polybutadiene glycol, dicarboxylic acid or diaminopolybutadiene glycol, polybutadiene dicarboxylic acid or diaminopolybutadiene in the presence of conventional hydrogenation catalyst. As a examples of hydrogenation, about 100 parts of the corresponding polybutadiene glycol, polybutadiene dicarboxylic acid, or diaminopolybutadiene is hydrogenized by reacting with hydrogen gas in the presence of 0.5–10 parts of catalyst such as Ni, Pt and Pd at less than 220° C under elevated pressure of 100 kg/cm$^2$ or ordinary pressure for a few hours to several tens of hours. Preferably, the hydrogenation is carried out in the presence of stabilized nickel or Raney Nickel, at 130°–180° C under a pressure of 10 kg/cm$^2$ for 10 to 30 hours in a solvent of xylene or kerosine. Ordinarily, the hydrogenation should be carried out up to 95% of unsaturated double bonds in the polybutadiene chain. Flexibility of the cured resin and shrinkage during curing are improved by the hydrogenation. Polybutadiene di-oxicarbonyl alkyl carboxylic acid is produced by the reaction between the polybutadiene glycol and alkyl, alkenyl or phenyl carboxylic acid anhydride such as maleic anhydride, citraconic acid anhydride, phthalic acid anhydride and anhydride derivatives thereof.

The polybutadiene chain in the invention mainly comprises more than 30%, preferably more than 50% of 1,2-configuration and residual amount of 1,4-configuration of butadiene unit. However, the polybutadiene chain may contain other kinds of comonomer residues not more than 50 weight % of the total weight of the polybutadiene chain. The following comonomers are suitable examples; styrene, α-methyl styrene, isoprene, methyl acrylate, ethylacrylate, methyl methacrylate and ethyl methacrylate. When the content of 1,2-configuration in the polybutadiene chain is less than 30%, obtained resin shows slow curing rate despite of higher curing temperature. On the other hand when the polybutadiene chain having a number average molecular more than 100,000 is used, the varnish composition is inferior working property because of the rise of viscosity and further when the polybutadiene chain having number average molecular weight less than 200 is used, the varnish composition is inferior in electrical property because of decrease of butadiene residue in the composition.

The solid plasticizer in the invention is defined as a polymer having 50°–170° C of softening point and less than 50 of bromine value and 500–3,000 of number average molecular weight, wherein softening point is defined in Japanese Industrial Standard K-2531 and bromine value is defined in ASTM D-1158-57T, when solid plasticizer having more than 50 of bromine value (gr./100 gr.) is employed, pot-life and storage stability are extremely shortened.

As a solid plasticizer, petroleum resin or hydrogenized petroleum resin which is prepared by polymerization of mono- or di-olefinic compound having 4–11 carbon atoms can be listed.

As examples of petroleum resin, polymerization product having 50°–170° C of softening point, less than 50 of bromine value and 500–3,000 of number average molecular weight produced from isobutene, butene-1, butadiene, trans-butene-2, cis-butene-2, 3-methylbutene-1, pentene-1, 2-methylbutent-1, pentene-2, isoprene, 2-methylbutene-2, Transpipelyrene, dicyclopentadiene, stylene, α-methylstyrene vinyltoluene and mixture thereof can be employed. Further, indene resin, coumarone resin, α-pinene resin and terpene resin also can be employed as a solid plasticizer.

The following are typical examples of solid plasticizer;

a. polymer produced by cationic polymerization of mixture of styrene, α-methylstyrene and vinyltoluene, having 75°–170° C of softening point, 20–45 of bromine value and having 150–2,000 of number average molecular weight.

b. polymer produced by polymerization of mixture of diolefinic hydrocarbon having 4–6 carbon atoms, having 100°–140° C of softening point, about 1,200 of number average molecular weight and 20–40 of bromine value.

c. polymer produced by hydrogenation of the above said polymer (a) and (b), having 600–900 of number average molecular weight, 80°–130° C of softening point and 0–3 of bromine value.

d. polymer produced by polymerization of coumarone and/or indene, having 50°–150° C of softening point, about 900 or more of number average molecular weight and 5–20 of bromine value.

e. polymer produced by polymerization of terpene having 80°–130° C of softening point, 60–760 number average molecular weight and 0–5 of bromine value.

As examples of the vinyl monomer styrene, α-methylstyrene, t-butylstyrene, chlorostyrene, divinyl benzene, vinyl toluene, propylacrylate, ethylacrylate, methylacrylate, propylmethacrylate, ethylmethacrylate, methylmethacrylate, ethyleneglycol dimethyacrylate, diethylfumarate, dimethylfumarate, diethylmaleate, dimethylmaleate, diallylphthalate can be listed and they are selected depending on the usage of the proposed composition. These vinyl monomer lowers viscosity of the composition and shortens the curing time.

The composition can be used for various goods. A typical composition for casting composition or varnish composition comprises 100 parts of the polybutadiene derivative, 5–120 parts of solid plasticizer, 50–500 parts of vinyl monomer and 0.1 to 10 weight % of curing agent per total amount of the polybutadiene derivative and vinyl monomer. When more than 120 parts of solid plasticizer per 100 parts of the polybutadiene derivative is employed in the invention, the amount of solid plasticizer passes over the solubility limits and original properties of solid plasticizer, namely hard and brittle properties of solid plasticizer appears. When less than 5 parts of solid plasticizer is employed, the cured resin is not flexible enough, the composition is controlled its viscosity by changing the amount of vinyl monomer, which imparts homogeneous solution.

The composition is used for impregnation, potting, dipping, encapsulation or painting according to traditional method. For examples, the varnish composition having 10–300 centipoise of viscosity at room temperature is preferably used for coils by impregnation or dipping and the varnish composition having 200–500 centipoise of viscosity at room temperature is used for armature and stator coils of motors by drip method and dipping or for coil of condensors or resistors by encapsulation. Curing can be completed at 60°–150° C, preferably 90°–120° C for 30 minutes — 5 hours in various curing method, for example, electric oven, infrared ray oven and radiation of electromagnetic wave or electron beam can be employed.

The composition makes many cross-linkages (three dimensional structure) by radical polymerization.

Examples of organic peroxide compounds, which may be employed in the invention include; diacyl peroxides, e.g., benzoyl peroxide, 2,4-dichlorobenzoyl peroxide, octanoyl peroxide, lauloyl peroxide; dialkyl peroxides, e.g., di-tert-butyl peroxide, dicumyl peroxide; alkyl peresters, e.g. tert-butyl perbenzoate, tert-butyl peracetate, di-tert-butyl perphthalate, 2,5-dimethyl 2,5-di(benzoyl peroxy) hexane; ketone peroxides, e.g. methyl ethyl ketone peroxide, cyclohexanone peroxide; hydroperoxides, e.g., tert-butyl hydroperoxide, cumen hydroperoxide, α-phenyl ethyl hydroperoxide, cyclohexenyl hydroperoxide, ketoalcoholpeoxide; (tert-butyl)peroxyhexane. With the organic peroxide, curing promoter can be used and the following curing promoters include amines, e.g., dimethylamine, diethylaniline and metal salts comprising between carboxylic acids e.g. octyl acid, stearic acid, oleic acid, linoleic acid, naphthenic acid and rosin acid and metals such as chromium, iron, cobalt, nickel, manganese and lead. When the amines are added, 0.1 to 5 weight % of amines to the total amount of the polybutadiene derivative and vinyl monomer is employed and in case of the metal salts, an amount of the salts corresponding to 0.0001 to 1 weight % of metal are preferably used per total amount of the polybutadiene derivative and vinyl monomer.

If desired, an adequate quantity of a silane coupling agent, filler and other additives are availablely added.

As examples of fillers, the following fillers are employed, e.g., talc, kaoline, asbestos, silica, glass fiber, mica, alumina, aluminium hydroxide, calcium carbonate, clay, and preferably added up to 700 weight % per total amount of polybutadiene derivative and vinyl monomer.

The composition makes resin having good adhesive property and flexibility, low dielectric loss tangent, low dielectric constant, high insulation resistance, excellent water and chemical resistance and no corrosion against metal copper and various kind of parts and equipments can be treated by the composition. The composition is preferably used for electronic and electric apparatus or parts, e.g., insulating varnish of coils for power source transformers, high-frequency transformers, intermediate frequency transformers, fly-back transformers, pulse transformers, broad-band transformers, ignition or solenoid coils, stators and rotors of motors, and coatings for primer of condensors or resistors.

The varnish obtained in the invention has good drying properties and crack resistance against PVC coated wire because the varnish has excellent flexibility.

All quantities described in this specification and the appended claimed as "parts" or "percent" refer to "parts by weight" or "percent by weight" unless expressly stated otherwise.

Generally speaking, the flexible polybutadiene resin contemplated herein has the following components: 100 parts of (a), 5 to 120 parts of (b), and 50 to 500 parts of (c), where a. is a thermosetting resin having a molecular weight of 500 to 100,000 and having the formula:

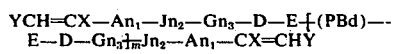

wherein X is hydrogen, or an alkyl radical containing up to four carbon atoms; Y is selected from the group consisting of hydrogen, phenyl, and alkoxycarbonyl; A is a carboxyl, or a carbonyl group; J is an alkylene group containing less than five carbon atoms and G is selected from the group consisting of urethane, carboimino and ureylene group; E is urethare or carboimino, and can be the same or different from G; D is selected from the group consisting of alkylene, cycloalkylene, phenylene, naphthylene, pyrene, bis(phenylene)methylene and tris(phenylene)methylidyne radical in which the radical may be substituted by a lower alkyl radical; PBd is a polybutadiene or copolybutadiene or hydrogenized polybutadiene chain having a polymerization degree of from 4 to 370 and from about 50 percent to about 100 percent of 1,2-configuration; $n_1$, $n_2$ and $n_3$ express 0 or 1 respectively, wherein a combination of (1) $n_1$ is 1, $n_2$ is 1, and $n_3$ is 0 and (2) $n_1$ is 1, $n_2$ is 0 and $n_3$ is 0 does not occur; and m expresses an integer of 1 to 3;

b. is a solid plasticizer having 50° to 100° C of softening point, less than 50 of bromine value and 500 to 3,000 of number average molecular weight; and c. is a vinyl monomer.

EXAMPLE 1

60 parts of polybutadiene derivative [A] having the following structural formula:

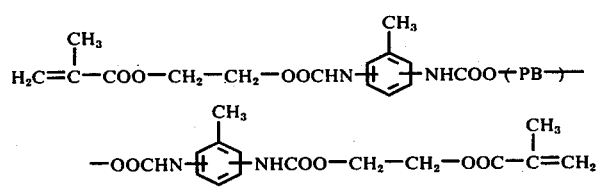

and 10 parts of petroleum resin [I] (number average molecular weight; 1,600, bromine value: 29, softening point: 144° C) were dissolved in 30 parts of styrene and then 0.25 parts of manganese naphthenate (containing 8 wt. % of manganese was added. Obtained resin composition [A'] was slightly brown. Further, 3 parts of lauroyl peroxide were dissolved in 100 parts of resin composition [A'] and a varnish composition [A''] thus was obtained.

A: preparation of polybutadiene derivative [A]

One mole of 2-hydroxyethylmethacrylate were gradually added to 1 mole of toluylenediisocyanate (a mixture of 80% of 2,4-toluylenediisocyanate and 20% of 2,6-toluylenediisocyanate) and the both were reacted for about 3 hours at 80° C while stirring. An isocyanate compound having olefinic bonds were obtained.

Then, the mixture of 1 mole of the isocyanate compound having olefinic bonds and 0.5 mole of polybutadiene glycol (number average molecular weight; 1,970, hydroxyl value; 49.7, 1.2-configuration; 91.9%,) were reacted for 4 hours at 80° C while stirring and polybutadiene derivative [A] thus was obtained.

EXAMPLE 2

Polybutadiene derivatives [B]~[K] were prepared by the same manner as shown in example 1 A using new materials listed in Table 1 and by mixing 60 parts of each polybutadiene derivative [B]~[K], 30 parts of styrene and 0.25 parts of manganese naphthenate, each resin composition [B']~[K'] was obtained correspondingly.

Then, 3 parts of lauroyl peroxide were added to the each resin composition [B']~[K'] and each varnish composition [B'']~[K''] was obtained accordingly.

[Testing methods]

The following testing methods were employed in order to evaluate the composition obtained.

storage stability

Each resin composition [A']~[K'] was maintained at 25° C in a tin plated container. The time period in days from start to the day when a precipitate insoluble in toluene was formed in each resin composition was measured. The results were listed in Table 2.

properties of varnish

Each varnish composition [B'']~[K''] was coated on tin plated plate of 50 mm + 150 mm + 0.3 mm and cured at 110° C for 2 hours and pencil hardness, flexibility and drying time were measured according to Japanese Industrial Standard (JIS). The results were listed in table 2.

corrosion to copper

Copper plate having 1 mm of thickness was dipped in a varnish composition [A''] for 30 days at 25° C and copper rust was not formed.

electric properties and chemical resistance

A varnish composition [A''] was cured at 110° C for 3 hours. Test plates having 300 mm + 3 mm were obtained.

Dielectric constant, dielectric dissipation factor and volume resistivity were measured.

The plates were respectively dipped in 20 weight % of $H_2SO_4$ aqueous solution, 10 weight % of $HNO_3$ aqueous solution or 20 weight % of NaOH aqueous solution for 10 days and the weight loss or gain was measured. The results were listed in table 3.

comparative example 1

10 parts of petroleum resin [II] (number average molecular weight; 950, bromine number; 132, softening point; 30° C) and 60 parts of polybutadiene (number average molecular weight; 3,880, 1,2-configuration; 91%) were mixed with 30 parts of styrene, and then 0.25 parts of manganese naphthenate (containing 8 wt. % of manganese) were added to the mixture obtained. A resin composition [L'] thus obtained was stightly brown. Further, 3 parts of lauroyl peroxide were dissolve in 100 parts of resin composition [L'] and a varnish composition [L''] thus obtained was tested according to the testing methods afore mentioned and the results were shown in table 2.

comparative example 2

By mixing 70 parts of polybutadiene derivative [A], 30 parts of styrene and 0.25 part of manganese naphthenate, a resin composition [M'] was obtained. Further, 3 parts of lauroyl peroxide were dissolved in 100 parts of the resin composition and thus, varnish composition [M''] was obtained. The composition was tested and the results were listed in table 2.

comparative example 3

10 parts of petroleum resin [II], 60 parts of polybutadiene derivative [A], 30 parts of styrene and 0.25 part of manganese naphthenate were mixed and a resin composition [N'] was obtained. Further, 3 parts of lauroyl peroxide were dissolved in 100 parts of the resin composition and a varnish composition [N''] was obtained. The composition was tested and the results were listed in table 2.

EXAMPLE 3

50 parts of polybutadiene derivative [O] having following structural formula:

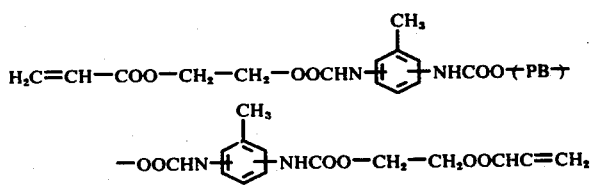

10 parts of petroleum resin [III] (number average molecular weight, 900, bromine number; 40, softening point; 120° C), 20 parts of ethyleneglycol dimethacrylate and 0.25 part of cobalt naphthenate were mixed and a resin composition [O'] thus obtained.

Further 2 parts of tert-butylperbenzoate were added in 100 parts of a resin composition [O'] and a varnish composition [O''] was obtained.

Storage stability, pencil hardness, flexibility, drying time were measured according to the aforementioned testing methods. The results were listed in table 4

Corrosion resistance to copper was tested for a resin composition [O'] and copper rust was not formed.

EXAMPLE 4

The varnish composition [P''] and [Q''] were prepared by the same manner as example 3 except that polybutadiene derivative [O] was replaced with polybutadiene derivatives [P] and [Q].

The varnish composition [P''] and [Q''] were tested according to the aformentioned testing methods. The results were listed in table 4.

A: preparation of polybutadiene derivative [O]

2,270 parts of polybutadieneglycol (number average molecular weight; 1,970, hydroxy value; 49.7, 1,2-configuration; 9.19%) and 348 parts of toluylene diisocyanate (mixture of 80% of 2.4-toluylenediisocyanate and 20% of 2,6-toluylene diisocyanate) were reacted for 4 hours at 80° C and an isocyanate prepolymer having butadiene chain thus was obtained.

Further, 260 parts of 2-hydroxylethylacrylate was added to the isocyanate prepolymer and the mixture were reacted for 4 hours at 80° C and a polybutadiene derivative [O] was obtained.

B: preparation of polybutadiene dervative [P] and [Q]

Polybutadiene derivative [P] and [Q] were prepared by the same manner as a polybutadiene derivative [O] was except that polybutadiene glycol was replaced with polybutadiene dicarboxylic acid (number average molecular weight; 1,490, acid value; 60.5, 1,2-configuration; 89.6%) or polybutadiene dioxicarbonyl vinyl carboxylic acid (number average molecular weight; 2,455, acid value; 43.0 1,2-configuration 91.9%) which was obtained by esterification reaction between polybutadiene glycol and maleic anhydride.

comparative example 4

30 parts of petroleum resin [II], 50 parts of polybutadiene (number average molecular weight; 3,880, 1,2-configuration; 91%), 20 parts of ethylene glycol dimethacrylate and 0.25 parts of cobalt naphthenate (containing 8% of cobalt) were mixed and thus, a resin composition [R'] with slightly brown was obtained. Further, 2 parts of tert-butylperbenzoate were added to the composition [R'] and varnish composition [R''] were tested according the aforementioned testing methods and the results were listed in table 4.

comparative example 5

80 parts of polybutadiene derivative [A], 20 part of ethyleneglycoldimethacrylate and 0.25 part of cobalt naphthenate were mixed and a resin composition [S'] thus obtained. Further, 3 parts of tert-butylperbenzoate were added to the composition [S']and a varnish composition [S''] was obtained.

These compositions were tested according to the aforementioned testing methods and the results were listed in table 4.

comparative example 6

50 parts of polybutadiene derivative [A], 30 parts of petroleum resin [II], 20 parts of ethyleneglycol dimethacrylate and 0.25 parts of cobalt naphthenate (containing 8% of cobalt) were mixed and a resin composition [T'] thus was obtained. Further, 3 parts of tert-butylperbenzoate were added to the composition [T'] and a varnish composition [T''] was obtained.

These compositions were tested according to the aforementioned testing methods and the results were listed in table 4.

Preparation of petroleum resin [I]

A fraction mainly containing mono and diolefine hydrocarbon having 6–9 carbon atoms obtained from oil crucking process was mixed with 0.1 wt% of boron trifluoride ethyletherate and the both were reacted at 15° C for 1 hour. After the reaction, the catalyst was removed and the unreacted material was distilled off. The polymerization product thus was separated at a yield of 95 wt%. Further, the polymerization product was added 1.0 wt% of boron trifluoride ethyletherate and reacted at 20° C for 3 hours. After the reaction, the catalyst was removed and a petroleum resin [I] was obtained.

Preparation of petroleum resin [II]

A fraction mainly containing mono and diolefine hydrocarbon having 5 carbon atoms (boiling point; 20°–60° C, obtained from oil crucking process was mixed with 1.0 wt% of boron trifluoride ethyletherate and the both were reacted at 20° C for 3 hours. After removing the catalyst and unreacted material, a petroleum resin [II] was obtained.

Preparation of petroleum resin [III]

A fraction mainly containing mono and diolefine hydrocarbon having 5 carbon atoms (boiling point; 20°–60° C, obtained from cracking oil) was mixed with 0.1 wt% of boron trifluoride ethyletherate and the both were reacted at 15° C for 1 hour. After the reaction, the catalyst and unreacted material were removed. A polymerization product was obtained. Further, the polymerization product was mixed with 1.0 wt% of boron trifluoride ethyletherate and the both reacted at 20° C for 3 hours. After the reaction, the catalyst was removed and a petroleum resin [III] was obtained.

Table 1

| polybutadiene derivatives | polybutadiene polymers | *4 m.w. | *5 OHV or AV | 1,2-content % | isocyanate compound having olefinc bond | |
|---|---|---|---|---|---|---|
| | | | | | diisocyanate compound | methacrylate or acrylate having active hydrogen |
| A | polybutadiene glycol | 1,970 | 50.3 | 92 | TDI | *7 2-HEA |
| B | polybutadiene glycol | 1,440 | 68 | 90 | TDI | 2-HEA |
| C | *1hydrogenized polybutadiene glycol | 2,032 | 50 | | TDI | 2-HEA |
| D | *2polybutadiene stylene glycol | 3,480 | 26 | | *6DPM | *8 2-HEMA |
| E | polybutadiene dicarboxylic acid | 1,490 | 60 | 90 | TDI | 2-HEA |
| F | polybutadiene dicarboxylic acid | 1,490 | 60 | 90 | TDI | *9 2-HPMA |
| G | *3polybutadiene di-oxicarbonyl ethylene carboxylic acid | 2,455 | 43 | 92 | TDI | 2-HEMA |
| H | polybutadiene di-oxicarbonyl ethylene carboxylic acid | 1,636 | 55 | 93 | TDI | 2-HEA |

Table 1-continued

| polybutadiene derivatives | polybutadiene polymers | *4 m.w. | *5 OHV or AV | 1,2-content % | isocyanate compound having olefinc bond | |
|---|---|---|---|---|---|---|
| | | | | | diisocyanate compound | methacrylate or acrylate having active hydrogen |
| I | polybutadiene glycol | 1,970 | 50 | 92 | vinylphenylisocyanate | |
| J | polybutadiene dicarboxylic acid | 1,490 | 61 | 90 | allylisocyanate | |
| K | *¹hydrogenized polybutadiene glycol | 2,032 | 50 | | vinylphenylisocyanate | |

*¹95% of unsaturated double bonds was hydrogenized.
*²60% of stylene and 40% of butadiene copolymer.
*³Reaction product of polybutadiene glycol and maleic anhydride.
*⁴Number average molecular weight
*⁵OHV; hydroxyl value, A.V.; acid value
*⁶diphenylmethanediisocyanate
*⁷2-hydroxyethylacrylate
*⁸2-hydroxyethylmethacrylate
*⁹2-hydroxypropylmethacrylate Table 2

| No. | 1 | 2 | 3 | 4 | 5 | 6 | 7 | 8 | 9 | 10 | 11 | comparatives | | |
|---|---|---|---|---|---|---|---|---|---|---|---|---|---|---|
| | | | | | | | | | | | | 12 | 13 | 14 |
| varnish composition | A″ | B″ | C″ | D″ | E″ | F″ | G″ | H″ | I″ | J″ | K″ | L″ | M″ | N″ |
| ²² | 20 | 25 | 25 | 20 | 23 | 22 | 20 | 21 | 24 | 21 | 23 | *4 | thickness (μ) | 23  20 |
| pencil hardness | 2H | 2H | 3H | 2H | 3H | 2H | 2H | 2H | 2H | 2H | 2H | H | 3H | 2H |
| flexibility (2mm φ) P*² (JISK-5400) N*³ | P | P | P | P | P | P | P | P | P | P | P | P | N *1 | P |
| drying time at 110° C (JISC-2103) hour | 1 hr | 1 hr | 2 hr | 2 hr | 1 hr | 1 hr | 1 hr | 1 hr | 2 hr | 2 hr | 2 hr | 2 hr | more than 10 hr | 2 hr |
| storage stability (days) | 70 | 80 | 85 | 70 | 90 | 120 | 110 | 80 | 105 | 110 | 120 | 45 | 120 | 25 |

*¹Film surface was sticky after 10 hours and the test was stopped.
*²Pass the test
*³Not pass the test
⁴Cured at 130° C for 10 hours.

Table 3 varnish composition [A″]
Dielectric constant at 25° C 1 KHZ ; 2.5
Dielectric dissipation factor 1 KHZ ; 0.004
volume resistivity (Ω cm) at    25° C    $1 \times 10^{16}$
                                100° C   $5 \times 10^{15}$
                                140 pC   $4 \times 10^{14}$
                                200° C   $2 \times 10^{13}$
                                25° C    $1 \times 10^{16}$=
*(after dipping in water at 20°C for 24 hours)
weight loss in    29 % $H_2SO_4$    0.18 %
                  10 % $HNO_3$      0.09 %
                  20 % NaOH         0.14 %

Table 4

| No. | 15 | 16 | 17 | comparatives | | |
|---|---|---|---|---|---|---|
| | | | | 18 | 19 | 20 |
| varnish composition | O″ | P″ | Q″ | R″ | S″ | T″ |
| *¹film thickness (μ) | 25 | 23 | 24 | 23 | 26 | 25 |
| *¹pencil hardness | 3H | 3H | 3H | H | 3H | 3H |
| *¹flexibility (2 mm φ) P*³ (JISK-5400) N*⁴ | P | P | P | P | N | P |
| drying time at 115° C (JISC-2103) hour | 1 hr | 1 hr | 1 hr | 2 hr | *² | 2 hr |
| storage stability (days) | 25 | 40 | 31 | 15 | 40 | 8 |

*¹varnish was cured at 115° C for 2 hours.
*²Film surface was sticky after 2 hours.
*³Pass the test
*⁴Not pass the test

We claim:

1. A flexible polybutadiene resin composition having 100 parts of (a), 5 to 120 parts of (b), and 50 to 500 parts of (c), where a. is a thermosetting resin selected from the group consisting of the 2-hydroxy-alkyl-acrylate compound and the 2-hydroxy-alkyl-methacrylate compound having the following formula:

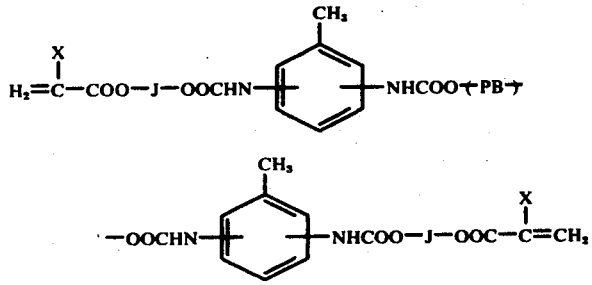

(wherein X = H or $CH_3$;

and J = $-CH_2-CH_2-$ or $-\underset{\underset{CH_3}{|}}{C}H-CH_2-$)″ b. is a solid plasticizer petroleum resin composition selected from the polymer group consisting of petroleum resins produced from the mixture of olefinic compounds having 6 to 9 carbon atoms, hydrogenized petroleum resin having 6 to 9 carbon atoms, coumarone resin, indene resin and terepene resin; and, c. is a vinyl monomer.

2. A resin composition as claimed in claim 1 including 0.1 to 10 weight percent of an organic peroxide per total amount of (a) and (c).

* * * * *